M. JOHANSEN.
LAWN MOWER SHARPENER.
APPLICATION FILED DEC. 9, 1912.
1,074,180.
Patented Sept. 30, 1913.
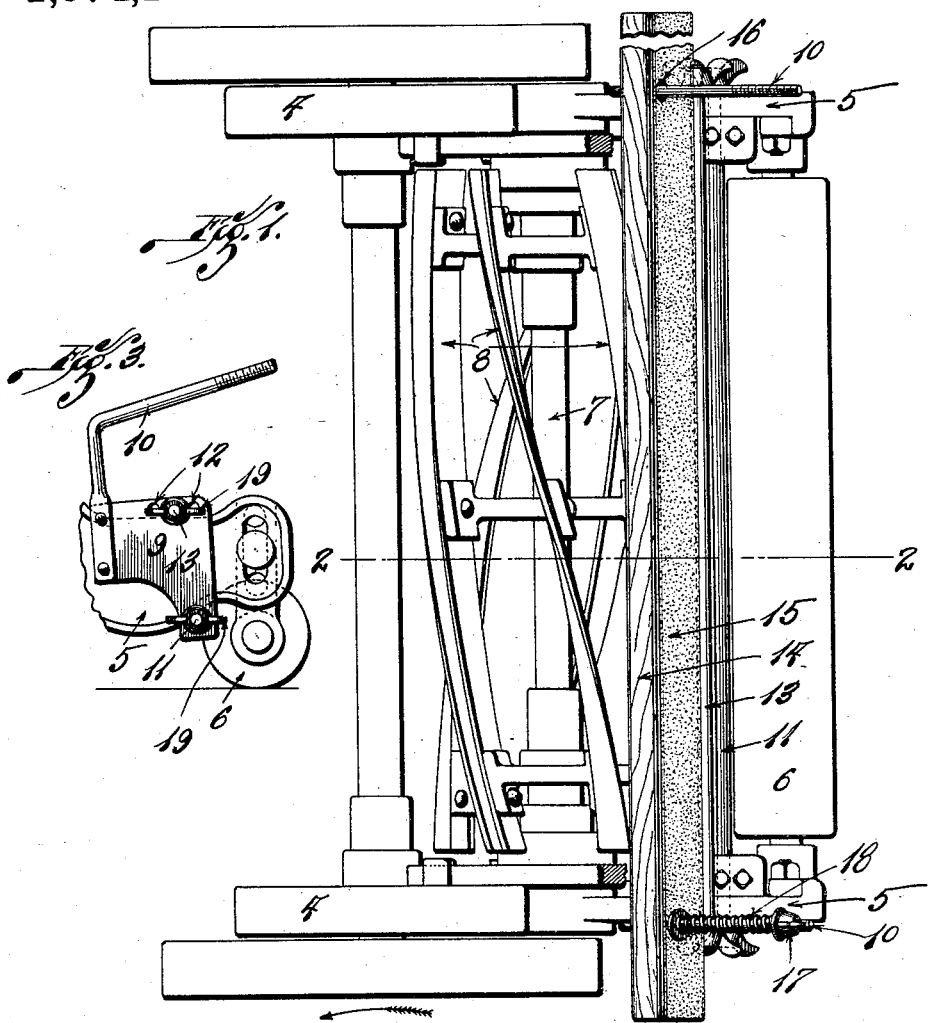
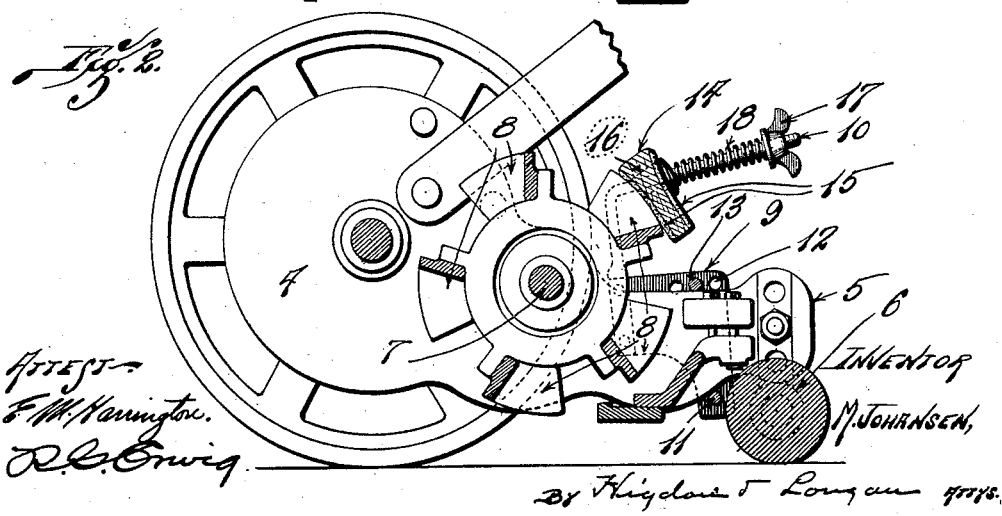

UNITED STATES PATENT OFFICE.

MIKKEL JOHANSEN, OF MAPLEWOOD, MISSOURI.

LAWN-MOWER SHARPENER.

1,074,180. Specification of Letters Patent. Patented Sept. 30, 1913.

Application filed December 9, 1912. Serial No. 735,670.

*To all whom it may concern:*

Be it known that I, MIKKEL JOHANSEN, a citizen of the United States, and resident of Maplewood, St. Louis county, Missouri, have invented certain new and useful Improvements in Lawn-Mower Sharpeners, of which the following is a specification containing a full, clear, and exact description, reference being had to the accompanying drawings, forming a part hereof.

My invention relates to improvements in lawn mower sharpeners, and the subject matter of this application is an improvement upon the construction of lawn mower sharpener shown in my application for U. S. Letters Patent, filed December 26, 1911, serially numbered 667,900, the Letters Patent for which were granted upon the 17th day of December, 1912, No. 1,047,814.

The object of my invention is to construct a lawn mower sharpener in the form of an attachment to the lawn mower, so that the sharpening of the blades of the mower may be accomplished by advancing the mower as in use, which sharpening attachment may be constructed at a minimum of cost and the sharpening element arranged to afford a maximum of sharpening surface.

With the above purposes in view my invention consists in certain novel features of construction and arrangement of parts as will be hereinafter more fully described, pointed out in the claims and illustrated by the accompanying drawings, in which—

Figure 1 is a plan of a mower, portions of the handle yoke being shown in section, the handle proper being removed and showing my improved sharpener attached to the mower; Fig. 2 is a transverse sectional elevation taken on the line 2—2 of Fig. 1; Fig. 3 is a side elevation of one of the extensions of the gear casing showing my improved support for the sharpening element.

Referring by numerals to the accompanying drawings: 4 designates the frame members of an ordinary mower, which frame members constitute casings for the gearing (not shown).

5—5 designate rearward integral extensions of the frame members which are arranged to hold the roller 6.

7 designates the shaft which carries the rotating blades 8.

All of the parts just referred to are of ordinary construction and form no part of my invention.

9—9 designate the side plates of my attachment. To each of the plates at their forward ends there is secured rod 10 which are substantially L-shaped, one arm of which extends approximately vertical while the other arm extends rearwardly and is inclined upwardly, the free end being threaded.

Adjacent the lower end of each of the plates 9 there is an opening arranged to receive a tie-rod 11, and formed in each of the plates adjacent their upper margins is a plurality of openings 12 arranged to receive the tie-rods 13.

14 designates the body portion of my sharpening element which is preferably constructed of wood and its faces concaved or dished.

Adjacent each end of the sharpening element an opening 16 is formed for the purpose of receiving the rearwardly extended arms of the rods 10 which rods, after having been extended through the openings in the body of the sharpening element, project some considerable distance rearwardly from the body of the sharpening element. These openings 16, as shown, are of much greater diameter than the diameters of the rods 10, in order that the body of the sharpening element may not be rigidly held by the rods against rocking.

17 designates winged nuts carried by the threaded ends of the rods 10, and 18 designates extensile coil springs embracing the rods 10 and impinging between the winged nuts 17 and the sharpening element.

The tie rods 11 and 13 are threaded at one of their ends in order to receive the winged nuts 19.

In applying my attachment to a mower the parts of the mower proper are not disturbed and their relative positions not changed. The plates 9 are positioned on the outside faces of the extensions 5 of the frame members, the rods 11 and 13 are then extended through the openings formed in the plate to receive the rods. These rods 11 and 13 extend below and above the extensions 5. For the reason that the contours of said extensions vary in different makes of mowers, I have provided a plurality of the openings in the plates adjacent their top margins, so that the plates may be fitted to any mower regardless of the shape of the rear extensions. The winged nuts 19 are then drawn up and the plates thus securely held against movement relative to the rear extensions of the frames. The sharpening element is then put in position with the rods 10 extended through the openings 16; the springs 18 are then applied over the rods and against the sharpening element and the winged nuts 17 are then applied to the rods for holding the springs 18. The operation of sharpening the blades of the mower may then be accomplished by a simple advancement of the mower, as in use, the curved face of the sharpening element affording a maximum sharpening surface for the blades, and the springs 18 serving to force the blades, and the angularity of the rods 10 holding the sharpening element in position to form a bevel edge on each of the mower blades. After each blade has been sharpened as desired or necessary, the attachment as a whole may be removed by loosening the tie-rods 11 and 13, or the sharpening element alone may be removed by taking off the winged nuts 17 and springs 18.

I claim:

1. In a lawn mower sharpener, a pair of plates, tie-rods for securing said plates to the frame members of the mower, rearwardly and upwardly inclined rods carried by said plates, a sharpening element having openings adjacent its ends carried by said rods, nuts secured to said rods and springs arranged between said sharpening element and said nuts, and openings through said sharpening element having greater diameters than the diameters of said rods, substantially as shown and for the purposes stated.

2. In a lawn mower sharpener, a pair of supports, means for detachably securing the supports to the lawn mower, a rigid sharpening element arranged to be carried by said supports in such manner as to permit of a free tangential movement relative to the arc of travel of the rotating blades of the mower, and means for exerting a yielding pressure to the sharpening element in the direction of the rotating blades.

In testimony whereof, I have signed my name to this specification, in presence of two subscribing witnesses.

MIKKEL JOHANSEN.

Witnesses:
E. L. WALLACE,
R. G. ORWIG.

Copies of this patent may be obtained for five cents each, by addressing the "Commissioner of Patents, Washington, D. C."